Nov. 10, 1970
J. L. WATERS
3,539,263
DIFFERENTIAL REFRACTOMETERS
Original Filed Aug. 24, 1965
3 Sheets-Sheet 1
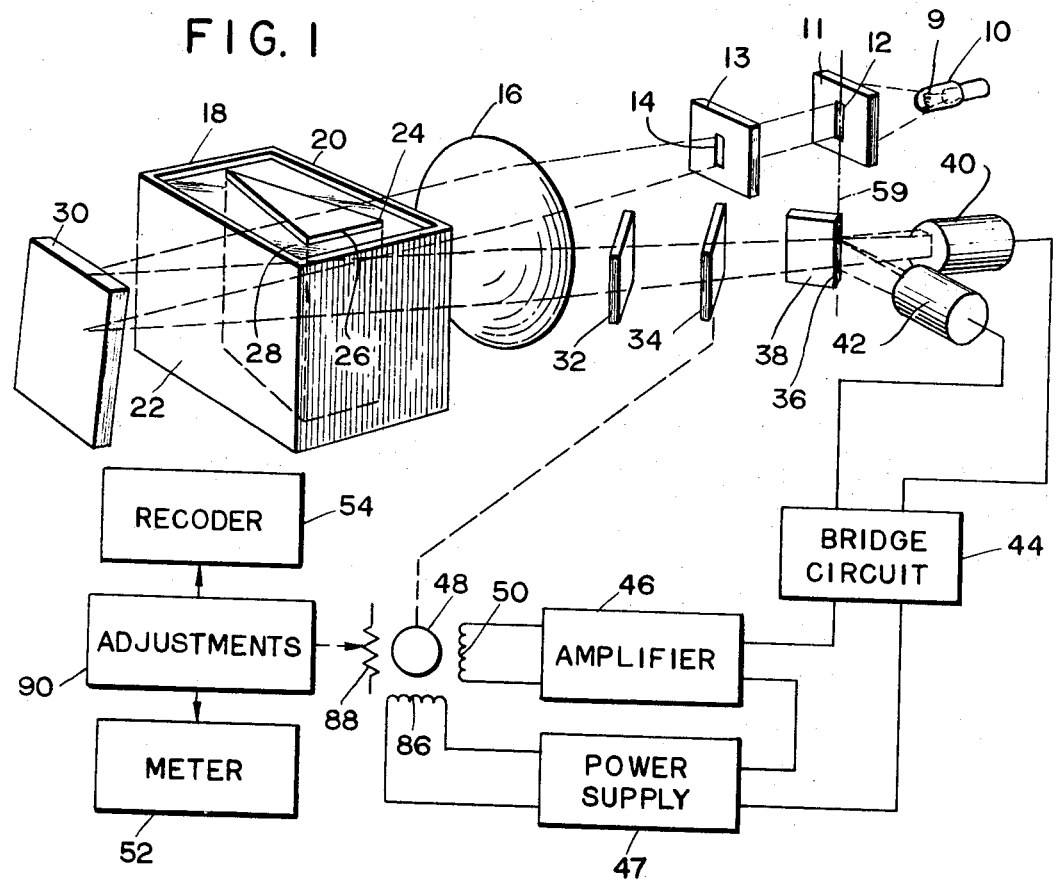
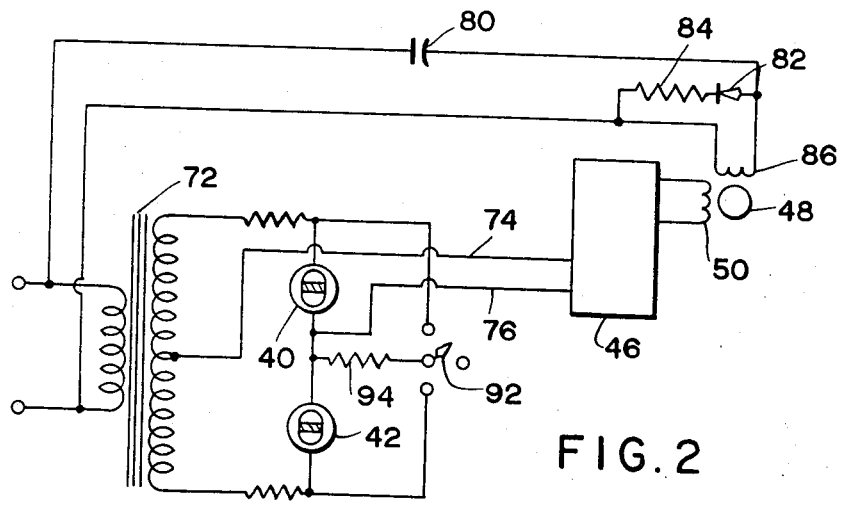

Nov. 10, 1970  J. L. WATERS  3,539,263
DIFFERENTIAL REFRACTOMETERS
Original Filed Aug. 24, 1965  3 Sheets-Sheet 2
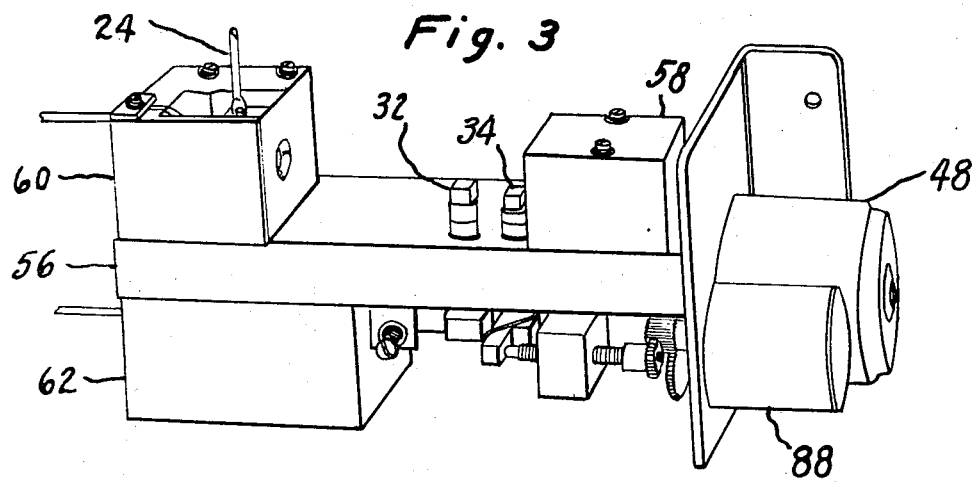
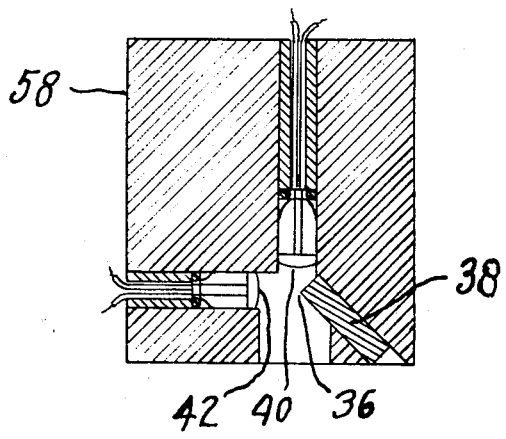
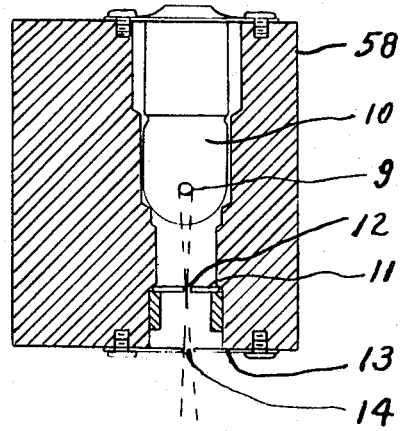
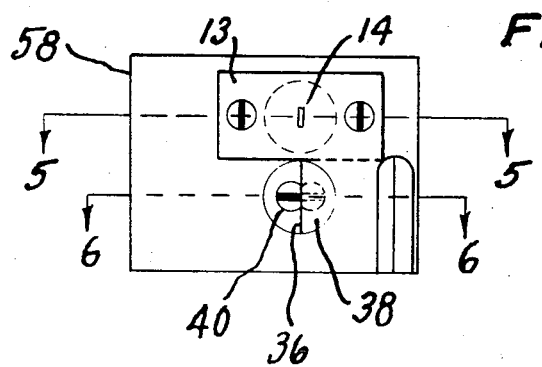
INVENTOR.
James L. Waters
BY Arnold C. Rood
Atty.

Nov. 10, 1970 — J. L. WATERS — 3,539,263
DIFFERENTIAL REFRACTOMETERS
Original Filed Aug. 24, 1965 — 3 Sheets-Sheet 3

INVENTOR.
James L. Waters
BY Arnold C. Rood
Atty.

3,539,263
DIFFERENTIAL REFRACTOMETERS
James L. Waters, 61 Fountain St.,
Framingham, Mass. 01701
Continuation of application Ser. No. 482,175, Aug. 24, 1965. This application Feb. 21, 1968, Ser. No. 712,322
Int. Cl. G01n 21/46
U.S. Cl. 356—130          1 Claim

ABSTRACT OF THE DISCLOSURE

A differential refractometer makes use of a cadmium sulphide photocell to provide high accuracy in a small overall size. A small refracting member and low-power light source, made possible by use of the cadmium sulphide detector, combine to reduce errors due to channeling and thermal effects.

---

This application is a continuation of my applications Ser. No. 44,745, filed July 22, 1960 (now abandoned) and Ser. No. 482,175, filed Aug. 24, 1965.

This invention relates to differential refractometers, and more particularly to such instruments of advantageous character for use in making continuous determinations with reference to liquids.

In the past, differential refractometers have been devised for various purposes and applications. However, such refractometers have been subject to various shortcomings which have in one way or another limited their wider use. Such shortcomings have included for example, lack of sufficient sensitivity for a given purpose, and costliness. Another shortcoming has been the matter of size, such as where the instrument has occupied greater space than was available at the place of intended use. Another factor militating against wider and more effective use of prior art differential refractometers has been their susceptibility to ambient temperature changes, resulting in inaccuracy of results.

The general object of the present invention is to provide a differential refractometer which obviates the above and other difficulties of the prior art.

By the present invention there is provided a differential refractometer of relatively small overall dimensions, rugged construction, high sensitivity and accuracy, and of improved economy both as to initial and operating costs. The improved differential refractometer of this invention finds particular application in process industries where control of composition or concentration of continuously flowing liquids is desired.

A differential refractometer according to this invention, and involving the above and other features, is provided by an instrument which embodies a light source which may be polychromatic and which conveniently may be a small incandescent lamp or bulb. A refracting member contains a reference liquid, and a sample liquid whose index of refraction is to be determined. Optical means are arranged to pass a beam from said light source through said refracting member one or more times and then to direct the beam to a beam bifurcating or splitting device, which desirably is a mirror, on an edge of which the beam impinges. According to an important feature of the invention, the bifurcated or split portions of the beam are received by two separate sections of photo-conductive surfaces which are highly sensitive to radiation, and which sections, according to a preferred embodiment, are composed of cadmium sulphide. The instrument embodies advantageous means, manually operated or automatic, and later to be described in detail, for balancing the two beam portions received by the photo-conductive, light-sensitive surfaces, and thus determining refraction in the refracting member.

A feature of great advantage with respect to the analysis of flowing process liquids is the provision of a construction, including a heat exchanger, whereby the refracting member and a continuous stream of sample liquid flowing therethrough may be maintained at equal and uniform temperatures independently of ambient temperature conditions and the flow rate of the sample liquid.

In other aspects, the invention involves various mechanical and electrical features, to be described in detail hereinafter, whereby sensitivity, accuracy and reliability of instrument determinations and sturdiness and compactness of construction may be achieved.

An illustrative embodiment of this invention embodying the above and other features is illustrated in the accompanying drawings wherein:

FIG. 1 is a diagrammatic view of a differential refractometer according to this invention;

FIG. 2 is a more detailed diagrammatic view of the electrical system associated with the instrument illustrated in FIG. 1;

FIG. 3 is a perspective view of the instrument;

FIG. 4 is a diagrammatic front elevational view of the container for the light source, photocells, and associated parts;

FIG. 5 is a horizontal sectional view taken on line 5—5 of FIG. 4;

FIG. 6 is a horizontal sectional view taken on line 6—6 of FIG. 4;

Figure 8:
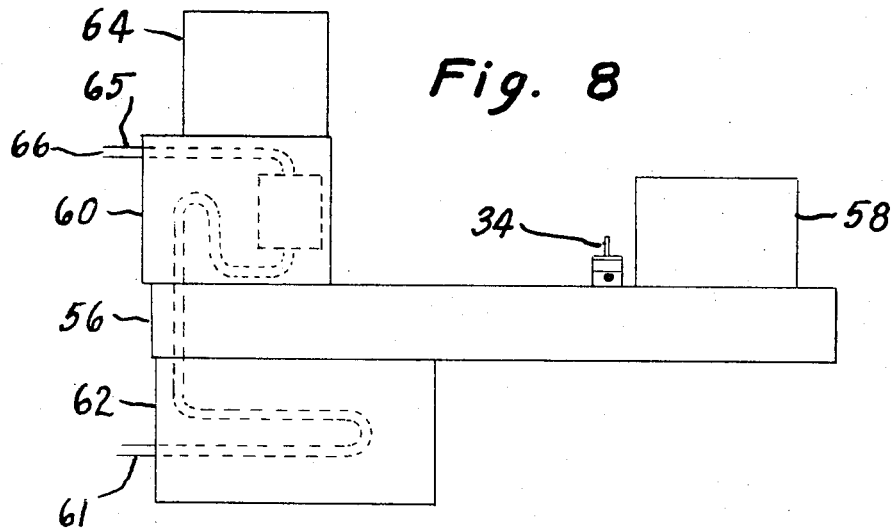
FIG. 8 is a diagrammatic elevational view illustrating the massive construction of the instrument and the heat exchanging means for the sample liquid.

Certain of the characteristics of a differential refractometer of this invention are illustrated diagrammatically in FIGS. 1 and 2, and will now be described generally. Thereafter, various of such features will be particularized, and other and highly important aspects of the invention set forth.

Referring now to FIGS. 1 and 2, light source 10, which may be a small incandescent lamp, emits visible light of polychromatic character. A beam from light source 10 passes through slit 12 and mask 14 toward collimating lens 16. After passing through lens 16, the beams, now with parallel rays, enters refracting member 18.

Refracting member 18 has parallel windows 20 and 22 which are in the path of the parallel rays issuing from collimating lens 16 and substantially perpendicular thereto. Refracting member 18 contains hollow prism 14 arranged to receive reference liquid of known index of refraction and disposed with its base 26 parallel to the entering beam. Member 18 further has space 28 surrounding prism 24 arranged to contain sample liquid, whose index of refraction is to be determined, which said sample liquid may and preferably does flow continuously through space 28.

The light beam from collimating lens 16 passes through refracting member 18 a first time entering at window 20 and leaving at window 22 and is reflected back by mirror 30 so as to pass through refracting member 18 a second time, thereby doubling the magnitude of the refraction of the beam. The twice refracted beam passes again through collimating lens 16 and then passes through zero deflector 32 and beam deflector 34. Deflectors 32 and 34 move the light beam laterally without otherwise effecting it, and will be described more fully hereinafter.

After passing through deflector 34, the beam strikes the longitudinal edge 36 of mirror 38, where the image of slit 12 is focused. Mirror 38 is angularly disposed with respect to the beam and functions to bifurcate it, or in other words, split the beam into two portions. One portion of the beam moves directly ahead and is received by photocell 40, and the other portion of the beam is shown as reflected at 90 degrees and is received by photocell 42. Photocells 40 and 42 have photo-conductive surfaces exhibiting high sensitivity to radiation. Presently preferred photocells have cadmium sulphide light-sensitive surfaces.

In the initial operation of the instrument, it is desired that the beam portions falling on photocells 40 and 42 be equal. This may be accomplished by first rotating deflectors 32 and 34 to approximately the middle of their range of adjustment. Then mirror 30 is adjusted so that the beam portions falling upon photocells 40 and 42 are substantially equal. A finer adjustment may be made by rotating deflector 32 to equalize the beam portions exactly, and then fixing deflector 32 in position.

In FIG. 1 the lines between photocells 40 and 42, bridge circuit 44, amplifier 46, and power supply 47 indicate that the photocells are operationally connected to the bridge circuit and amplifier. In actual fact this connection is one of electrical conductors. The difference in electrical effect in photocells 40 and 42 supplies an input to amplifier 46. As illustrated herein, power supply 47 provides energizing power to operate these circuits.

During the operation of the instrument, if the index of refraction of the sample liquid flowing through refracting member 18 varies from its original value, the split beam portions falling on photocells 40 and 42 will be unequal or in other words, unbalanced. Means, to be described, are provided for adjusting beam reflector 34 to maintain equal the split beam portions and means are provided for ascertaining the amount of adjustment of beam deflector 34 required to equalize the split beam portions falling on said photocells 40 and 42. The amount of adjustment required to equalize the split beam portions is a measure of the change in the index of refraction of sample liquid and with this information the composition of the sample liquid may be determined.

As illustrated, cadmium sulphide photocells 40 and 42 are connected in alternating current electrical circuit 44 arranged to indicate by electrical signal the relative magnitude of the split beams. The electrical signal produced when the split beams are unbalanced, or in other words, unequal in magnitude, is magnified in amplifier 46. A two-phase induction motor 48 is provided, one phase 50 of which is powered by the amplified signal. Motor 48 and rotatable beam deflector 34 are operatively connected to deflect the reflected beam passing through said deflector 34 to an extent and in a direction to balance electrical circuit 44. The extent and direction of rotation of beam deflector 34 necessary to equalize the split beams is a measure of the change in index of refraction of the sample liquid in space 28 and may be determined by reference to meter 52 or recorder 54.

The massive, rigid, sturdy, yet compact construction of the differential refractometer of this invention is illustrated in perspective view in FIG. 3 and diagrammatic view in FIG. 8. Thus, the component parts of the instrument are mounted on and in association with a massive aluminum base 56, which may be a matter of 1″ thick, 2½″ wide, and 11″ long. Aluminum base 56 is highly heat conductive, and in spite of its massiveness, is relatively light in weight.

One of the highly advantageous characteristics of the instrument of this invention is its temperature stability with respect to ambient temperature changes and temperature changes in the sample liquid flowing therethrough. This feature of temperature stability is highly important in view of the fact that the index of refraction of most liquids varies with temperature. Contributing to this end, and to the mechanical stability of the instrument, it will be noted that various of the constituent elements of the instrument, and more particularly certain optical elements are mounted within massive aluminum members which in turn are secured to base 56 and in good thermal contact therewith. Thus, massive aluminum members 58, 60 and 62 are secured in good thermal contact to the base 56, and cover member 64 is secured in good thermal contact to the member 60. These members will be described in detail hereinafter.

Member 58 (FIGS. 3, 4, 5, 6 and 8), as illustrated, contains light source 10, slit member 11, beam-splitting mirror 38, and cadmium sulphide photocells 40 and 42, and to the container 58 is affixed mask member 13 having masking aperture 14.

Light source is secured to member 58. Light source 10 may be a small incandescent light bulb utilizing approximately 10 watts when operated at 6.3 volts. In actual practice, bulb 10 is operated at 5 volts whereby the temperature of the filament 9 is reduced with the result that the life of the light source is extended more than twenty times beyond its normal life. Because of the fact that light source 10 is contained entirely within the aluminum housing 58 which as good thermal conductivity and because of the low total watts generated in light bulb 10, the heat from said light bulb is readily dissipated. The use of a low intensity light source as just described in made possible by reason of the high light sensitivity of the cadmium sulphide photocells 40 and 42.

Slit member 11 is mounted forwardly of light source 10 and is provided with slit 12 which serves to restrict the light beam issuing from the light source filament 9. Vertical slit 12 is narow, for example of the order of 0.003 inch, so that the image of the beam on beam-splitting mirror 38 will be narrow whereby a small deflection of the image will cause a large change in the relative strength of split beam portions falling on photocells 40 and 42. Mask member 13 which is secured to the outer side of housing member 58 is provided with a narrow vertical aperture 14, the purpose of which is to limit the size of the issuing light beam to the effective area of collimating lens 16.

In a differential refractometer it is desirable that the instrument be sensitive to the change in index of refraction of one liquid with respect to another but not be sensitive to a change which equally affects both liquids. In order to illustrate this, it can be assumed that all of the liquid within refracting member 18 is one liquid and that the prism is removed; thus no differential change in index of refraction is possible. In order to assure that the image falling on beam-splitting mirror 38 does not deflect in a horizontal direction, if the temperature of the sample liquid changes, it is necessary that the angle between the front surface 20 and the beam to 36 be the same as the angle between the front surface 20 and the beam from 12. It is further desirable that this angle be close to 90 degrees as possible. In order to meet this requirement that the angles in the horizontal plane be the same, it is necessary that the edge of the beam-splitting mirror 38 and the line formed by slit 12 be in effect separate portions of the same straight vertical line. This feature is shown in FIGS. 1, 4, 5 and 6. It is not necessary that the two images fall in exactly the same vertical position. The angle that these beams make with respect to the cell in a vertical plane does not have to be the same because vertical deflections of the image on the edge of mirror 38 cause no changes in the relative intensity of the beams falling on photocells 40 and 42.

In accordance with the above discussion, beam-splitting mirror 38 and cadmium sulphide photocells 40 and 42 are rigidly mounted in housing member 58 directly below the light source and associated members. Thus, the forward edge 36 of angularly disposed mirror 38 constitutes in effect an extension of a vertical line 59 passing through said edge and slit 12. An entering light beam impinges on said forward edge 36 and is there bifurcated or split to form two light beam portions, one of which passes directly ahead and is received by the light sensitive surface of photocell 40 and the other portion of which is reflected at right angles to be received by photocell 42.

Cadmium sulphide cells 40 and 42 have highly advantageous characteristics as employed herein, namely as a detector. They have very high sensitivity to light. They are photoconductors and are sensitive to a relatively narrow portion of the total visible spectrum. Accordingly, high light intensities are not required. Furthermore, it is possible to use alternating current excitation because cadmium sulphide photocells have equal resistance regardless of the direction of curent flowing thereto, and moreover, it is not necessary to employ monochromatic or filtered light. A cadmium sulphide photocell such as employed herein may be defined as a photo resistive cell which has a resistance of less than 8 megohms when a square area not greater than $3/64''$ on a side is illuminated by 2 foot candles. It will be understood that photosensitive materials other than cadmium sulphide and having the characteristics outlined above, come within the purview of this invention.

Figure 9:
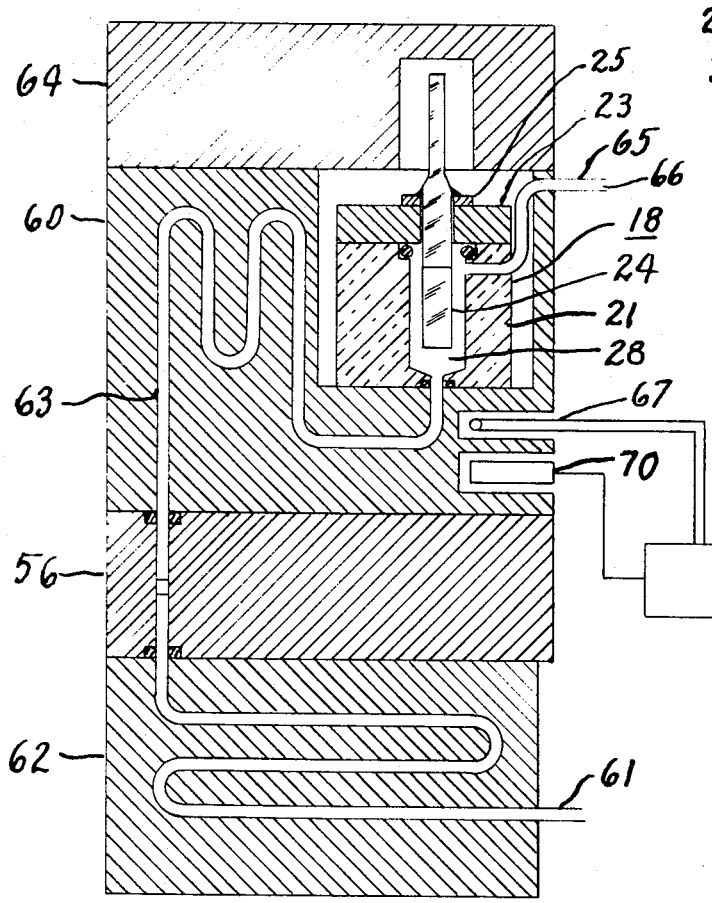
FIG. 9 is a diagrammatic vertical sectional view illustrating the refracting member, the heat exchanging means for the sample liquid, and means for temperature control of the heat exchanging means.
Figure 7:
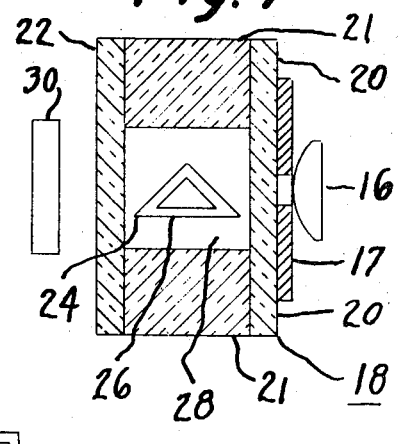
FIG. 7 is a diagrammatic horizontal sectional view of the refracting member and associated parts.

In FIGS. 7 and 9, refracting member 18 is shown as generally rectangular in shape, with front and rear window members 20 and 22, which are joined by member 20 which forms the side walls and bottom of the refracting member. Cover member 23 is secured to members 20, 21, and 22. Hollow prism 24, the constricted upper end of which may be open, is shown as extending through an aperture in cover 23, and as supported above the bottom of the refracting member by ring member 25 which is secured in liquid-tight relation to cover 23 and prism 24. Masking member 17 may be disposed directly in front of window member 20 to limit the light rays issuing from collimating lens 16 to the appropriate area of prism 26. It may be noted that since prism 26 may be of relatively small dimensions, and thus may contain a relatively small amount of reference liquid, circulation of the reference liquid is not required in order to maintain it and the circulating sample liquid at substantially the same temperature.

To preclude chemical reactivity during the passage of sample liquid through the heat exchangers, stainless steel tubing may be embedded therein. This may be accomplished by suitable shaping tubing members 61 and 63 and then casting heat exchangers 60 and 62 around them. Tubing member 65 provides communication from space 28 to outlet 66.

Referring to FIG. 9 the liquid in passing into the analyzer passes first through heat exchanger 62 then through base 56 and heat exchanger 60 where it passes through the sample portion 28 of the refracting member 18 and then to outlet 66. The purpose of heat exchanger 60 is to bring the liquid temperature close to the temperature of the refracting member 18. The purpose of heat exchanger 60 is to bring the sample liquid still closer to the desired temperature. Experience shows that these two heat exchangers are sufficient to bring the liquid temperature to within 0.01° C. of the desired temperature. Under ideal conditions this arrangement would be adequate. Unfortunately two difficulties are encountered. Changes in the temperature or flow rate of sample liquid entering heat exchanger 62 cause slow temperature changes in that body and hence slow temperature changes in 60 because of a changing heat demand. A similar effect is encountered due to changes in ambient air temperature around the two heat exchangers. When the temperature of 60 changes, the temperature of the sample liquid entering chamber 28 changes. This would cause no difficulty if the reference liquid in prism 24 immediately assumes the same temperature. Because the liquid in prism 24 has mass, and because it is to some degree thermally isolated from the sample liquid in space 28, it does not immediately arrive at the same temperature. In order to avoid false signals due to changing temperature of sample liquid in space 28 caused by changing temperature of heat exchanger 60 it is necessary that the rate of change of temperature in heat exchanger 60 by relatively slow. This is accomplished by a proportional control circuit consisting of a thermistor 67, an electronic amplifier 68, and a heater 70 connected so that an increase in temperature in member 60 causes a change in resistance in thermistor 67 which through the action of amplifier 68 results in a decrease in the heat generated in heater 70. The use of a proportional controller reduces the rate of temperature change and the total temperature change in member 60 by 10 to 100 times and in this way increases the stability of the differential refractometer by 10 to 100 times.

Temperature change is not undesirable as long as such change is low enough so that the comparison liquid can assume the same temperature.

It is desirable that prism 24 be removable without disturbing any of the other components of the analyzer. This makes possible the cleaning of the prism 24 or the windows 20 and 22. In addition, the angle formed at the apex of the prism 24 determines the sensitivity of the refractometer. In order to change the range of the instrument it is desirable to be able to change prisms without changing any of the other parts of the analyzer.

When the optical beams to 40 and 42 are unequal the resistance of cells 40 and 42 as shown in FIG. 2 will be unequal. As a result the current passing through the two photocells 40 and 42 in series (FIG. 2) will cause the voltage at the point between the photocells to differ from the voltage halfway between the extremes of transformer 72. This will cause an output signal between wires 74 and 76. When the two beams are equal the resistance of the two photocells 40 and 42 will be equal and the voltage on wire 74 will be the same as the voltage on wire 76 and hence there will be no input to the amplifier.

The cadmium sulphide photocells 40 and 42 are photoconductive and their resistance is the same regardless of the direction of current passing through them. Hence the circuit described above can be an alternating current circuit and as a result the voltage between 74 and 76 will be an AC voltage. This AC voltage can then be amplified and applied directly to one winding 50 of the servo-motor 48. If this AC voltage is of the power line frequency the second winding 86 of the servo-motor 48 can be supplied through a condenser 80 from the power line. When this is the case the servo-motor will drive as long as a voltage exists between 74 and 76 and the motor 48 can be made to drive in a direction which will reduce the unbalance between the two optical beams.

In a servo system it is often desirable to damp the servo-motor. This is accomplished by placing rectifier 82 and resistor 84 in series and then in parallel with motor winding 86. The rectifier and resistor cause a DC current to flow through winding 86 in addition to the AC current normally passing through it. It is well known that a DC current in one of the two phases of this type of servo-motor results in a damping action. Damping tends to reduce the tendency of a servo system to oscillate. It also reduces the rate at which the servo system responds.

The motor 48 in operating rotates glass beam deflector 34, which is a block of glass with parallel sides. As the angle between the normal of one of the parallel surfaces and the light beam passing therethrough increases, the horizontal displacement of the beam increases in accordance with well known optical principles. Thus the rotation of 34 deflects the optical beam and can be used to maintain the beam position in equal division on the edge 36 of mirror 38.

In this way changes in the index of refraction of sample liquid cause glass beam deflector 34 to be rotated and the position of 34 is a measure of the index of refraction of the sample liquid. Deflector 34 is connected to a potentiometer in such a way that an output voltage proportional to the position of deflector 34 is generated. This voltage is then used as a measure of the index of refraction of the sample liquid and is conducted to meter 52 and recorder 54. In order to change the sensitivity of the instrument, span and zero adjustments are incorporated in member 90 to modify the electrical signal to the meter 52 and recorder 54.

The test switch 92 is used to indicate that the instrument is functioning properly. It operates by placing a resistor 94 in parallel with one of the two photocells 40 or 42. In this way it effectively modifies the resistance of the cell and causes an output signal between leads 74 and 76. The glass beam deflector 34 then rotates to rebalance the resistance, even though this actually represents an unbalance between the two beams. The amount of deflection of 34 is used as a measure of the proper operation of the instrument.

Motor 48 may be replaced by manual means (not shown) for rotating beam deflector 34. In such case, the output of amplifier 46 is conducted to a null indicating meter (not shown). When this meter is deflected, it indicates that the beams should be rebalanced manually. With such an arrangement, potentiometer 88, zero and span control 90, recorder 54, and meter 52 may be replaced by a standard revolution counter mechanically connected to beam deflector 34 and the manual means for rotating it, in order to indicate the position of beam deflector 34 when the beams are balanced manually.

It will be understood that various modifications may be made while still coming within the scope of the invention.

Having disclosed my invention, what I claim as new and desired to secure by Letters Patent of the United States is:

1. A differential refractometer comprising a light source, a restrictive slit member, a refracting member arranged to contain a reference liquid and a sample liquid whose index of refraction is to be compared with that of said reference liquid, means directing an incident beam of light from said slit member to a forward surface of said refracting member, a mirror disposed rearwardly of said refracting member and arranged to receive said incident beam and reflect it back through said refracting member as a reflected beam, a beam splitter having an edge disposed in the path of said reflected beam to split said reflected beam into two parts, and a detector responsive to the relative strengths of said two parts, said edge and the axes of the incident and reflected beams being in a common plane, said common plane being substantially perpendicular to said forward surface of said refracting member.

References Cited

UNITED STATES PATENTS

| | | |
|---|---|---|
| 2,612,814 | 10/1952 | Glasser. |
| 2,802,109 | 8/1957 | Waters. |
| 3,013,465 | 12/1961 | Collyer. |
| 3,028,499 | 4/1962 | Farrall. |
| 3,163,767 | 12/1964 | Witt et al. |

RONALD L. WIBERT, Primary Examiner

T. MAJOR, Assistant Examiner

U.S. Cl. X.R.

356—131